Jan. 2, 1962 A. W. BROUGHTON, JR., ET AL 3,015,503
EXPANSIBLE PACKING
Filed Dec. 24, 1957 2 Sheets-Sheet 1

INVENTORS:
AMOS W. BROUGHTON, JR.
HERMAN G. KOCH
BY
John A. McKinney
ATTORNEY

United States Patent Office 3,015,503
Patented Jan. 2, 1962

3,015,503
EXPANSIBLE PACKING
Amos W. Broughton, Jr., Neshanic, and Herman G. Koch, Somerville, N.J., assignors to Johns-Manville Corporation, New York, N.Y., a corporation of New York
Filed Dec. 24, 1957, Ser. No. 704,932
2 Claims. (Cl. 286—7)

The present invention relates generally to sealing devices, and more particularly, to an improved packing of the expansible type.

Heretofore, sealing devices employing telescoping parts arranged to interact against each other for expanding one of them into sealing contact with spaced sealing surfaces have been deficient in many respects. One respect in which the deficiency has been apparent is where this type of seal has been employed for sealing against the surfaces of tubes, and the like, made of frangible materials such as glass, etc. The difficulty of controlling the expansible forces in sealing assemblies of the above type has frequently resulted in fracturing the material forming the sealing surface with consequent inconveniences which are thought to be apparent, especially in arrangements handling highly corrosive fluids. Furthermore, some of the most highly effective non-corrosive materials such as, e.g., polytetrafluoroethylene ("Teflon") which might have been useful, have been thought in the past not to be suitable for use in the manufacture of devices of the aforesaid type, due to their physical characteristics of being substantially non-deformable except in very thin cross-section and being relatively incompressible.

Accordingly, a primary object of the instant invention is to provide an improved expansible sealing device which is particularly adapted to bear in sealing contact against a frangible sealing surface for providing a fluid seal thereat without the likelihood of fracturing the same, and at the same time being formed of a relatively incompressible material which may be highly inert to the action of most organic solvents so that it will withstand deterioration over long periods of use and under widely varying conditions of temperature and pressure.

Another object of the present invention is to provide a fluid sealing device of the aforesaid type which is of simple and compact construction, economical to manufacture, easy to install and capable of effecting an efficient sealing action over a prolonged service life with a minimum of maintenance.

A further object of the present invention is to provide a substantially annular packing configuration having a plurality of inter-telescoping parts movable with respect to each other, upon the application of pressure, within certain predetermined limits and arranged, within the range of such movements, to displace the sealing edge portions thereof only within the elastic limits of the material, the configuration being such that substantial movement is nevertheless accomplished in respect to the sealing edges of said device as compared with such elastic limits, whereby such device may be formed, e.g., of non-corrosive materials such as "Teflon" which inherently may be non-resilient and flexible only in relatively thin cross-section.

Still another object of the present invention is to provide an improved sealing device of the aforesaid type having substantially concentric relatively flexible sealing lip portions integrally united along one edge of each thereof by a relatively inflexible base portion, in combination with a substantially annular expansion ring adapted to telescopically fit between said lip portions at their open end, together with abutment means provided therebetween to limit relative axial movements, it being a particular feature that within the limits of said relative axial movements said expansion ring will be arranged to cause separation of said sealing lip portions by outside pressure exerted along points between the open end edges of said lip portions and said base portion, whereby the sealing lip edges will be urged into sealing contact with the surface to be sealed without the application of unyielding pressures at the lines of sealing contact.

As indicated above, a material particularly suitable for the purposes of this invention is polytetrafluoroethylene which is commercially available under the trade name "Teflon." For convenience, the term "Teflon" will be employed hereinafter to refer to that substance and to other substances having substantially similar characteristics. Although "Teflon" (and probably other materials of somewhat similar nature, which have been or may be hereinafter developed) has a low coefficient of friction and resistance to breakdown and decomposition from highly corrosive fluids which attack and destroy many available packing substances, it is substantially non-deformable except in thin sections. Also, it is difficult to mold or otherwise process "Teflon" to produce sealing shapes commercially to a precise size. Consequently, and also because of the relative non-deformability of "Teflon," it is extremely difficult to produce commercially a packing device assembly which can easily be mounted in position between a pair of spaced circumferential sealing surfaces, and wherein the device will function properly as a packing.

It is, therefore, a further object of the present invention to provide a packing assembly which need not necessarily be formed to the precise size of the substantially annular clearance within which it is to be disposed for packing purposes.

Further objects and advantages of the present invention will be apparent in view of the specification set forth hereinafter.

Referring more particularly to the drawings, the embodiment of the invention illustrated therein is comprised of a pair of inter-telescoping members 10 and 12, as shown in FIGS. 1 through 8, inclusive. The member 12, preferably, is formed as by machining from billet stock of a material such as "Teflon" into a substantially annular configuration of generally U-shaped cross-section. Since "Teflon" is relatively non-deformable except in thin sections, it is considered important to the successful practice of the instant invention that the member 12 be formed with substantially concentric sealing lip portions 14 and 16 of relatively thin cross-section in comparison to the thickness of the integrally conjoining base portion 18, the thickness of the base portion in relation to the ring height preferably being approximately in the ratio of 1:4.

It is also a feature of the instant invention that the sealing lip portions 14 and 16 of the substantially annular member 12 will be machined into sufficiently thin cross-sectional form throughout so as to permit flexing thereof inwardly and outwardly, respectively, with respect to the axial center thereof. It will be understood that the sealing function will be accomplished by placing upper sealing lip edge portions 20—22 of the sealing lips 14—16, respectively, into sealing contact with a pair of spaced generally concentric sealing surfaces as, e.g., in the manner illustrated in FIG. 8.

Figures 1, 2:
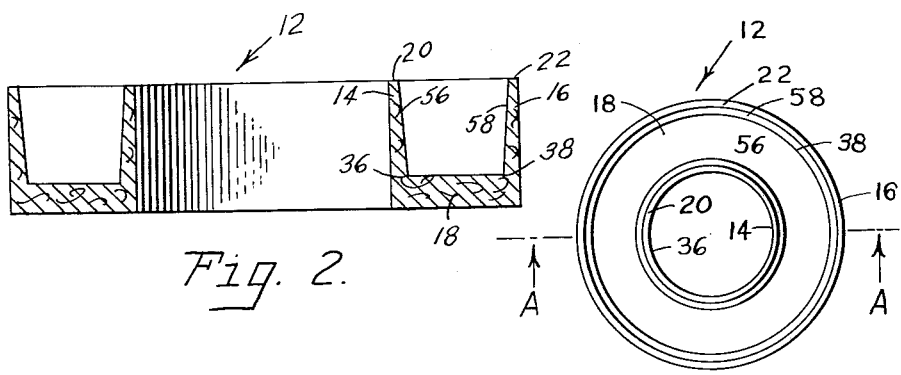
FIG. 1 is a top plan view of a partial embodiment of the present invention.
FIG. 2 is a partly cross-sectional view taken along the lines A—A of FIG. 1.
Figures 3, 4:
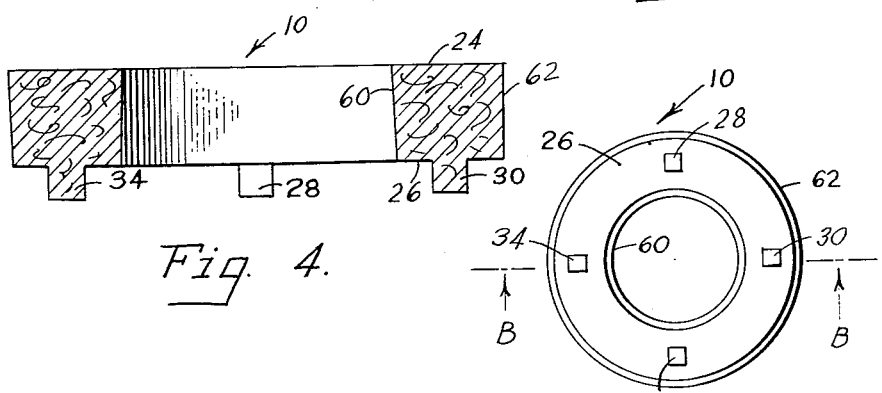
FIG. 3 is a bottom plan view of another partial embodiment of the present invention.
FIG. 4 is a partly cross-sectional view taken along the lines B—B of FIG. 3.

A further particular feature of the present invention is to provide means for exerting outside pressure on the sealing lips 14—16 from inwardly thereof along points between the base portion 18 and the sealing lip edges 20—22, the preferred arrangement also being such that unyielding pressures will not be applied at the lines of sealing contact effected at said sealing lip edges. The member 10 is particularly suited to perform this function by being formed into substantially annular form of generally trapezoidal cross-sectional shape as shown in FIGS. 3 and 4. Thus, the expansion ring member 10 is provided with flat and parallel opposed upper and lower faces 24 and 26, the lower of which, in the specific embodiment of the invention illustrated, being provided with stop portions in the form of integral bosses or protrusions 28, 30, 32, and 34 positioned at 90° intervals along the circumferential flat surface 26.

As noted above, materials most suitable for sealing against a variety of organic solvents, e.g., "Teflon," are frequently non-deformable except in thin cross-section, and then only within very limited ranges of elasticity as, e.g., where such thin flexible sections form integral parts of packing configurations having relatively inflexible integral conjoining connecting portions, as, e.g., base portion 18 of member 12. Thus, it will be appreciated that flexing of the sealing lip portions 14 and 16 of the member 12 will create localized concentrations of stresses in the areas 36 and 38, respectively, at the base of the lip portions, which would readily cause fractures thereat unless the applied forces were maintained within certain predetermined limits.

Figure 8:
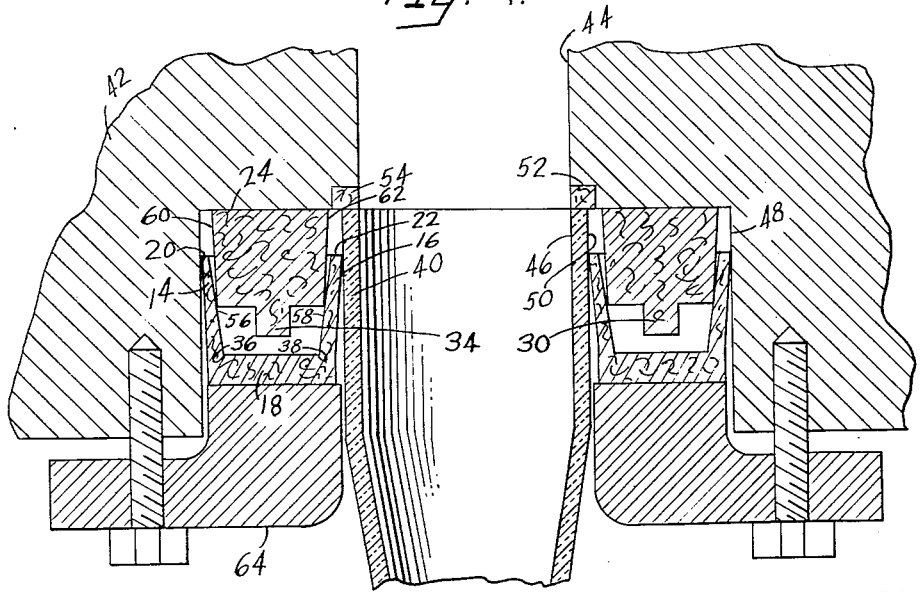

Furthermore, as noted above, "Teflon" and like materials, are substantially incompressible and for this reason application of outside pressures at the points of sealing lip contact, namely portions 20 and 22, would frequently result in fracture of the sealing areas as where such areas were provided by frangible materials, as e.g., in the arrangement shown in FIG. 8 wherein a glass tube element 40 is fitted inwardly of a metal housing 42 provided with an opening 44 arranged to be aligned with opening 46 of said glass tube, and having a counterbore 48, the circumferential wall of which together with the outer surface 50 of the glass tube 40 define a generally annular recess within which may be accommodated a sealing device of the present invention. A recess 52 may be provided at the base of the counterbore 48 to accommodate a resilient washer 54 to provide a cushion and end support for the frangible glass tubing 40. However, it will be appreciated that in arrangements of this type slight deflections of the glass tubing will frequently permit escape of fluids channeled through the glass tubing into the opening 44, and, especially where such fluids may be highly corrosive, a corrosive resistant sealing device is necessarily required in the opening defined by the spaced circumferential sealing surfaces 48 and 50. Furthermore, the sealing lip portions must be readily conformable to the surfaces to be sealed in order to maintain an effective seal even under conditions of slight displacements of the one relative to the other.

Figure 6:
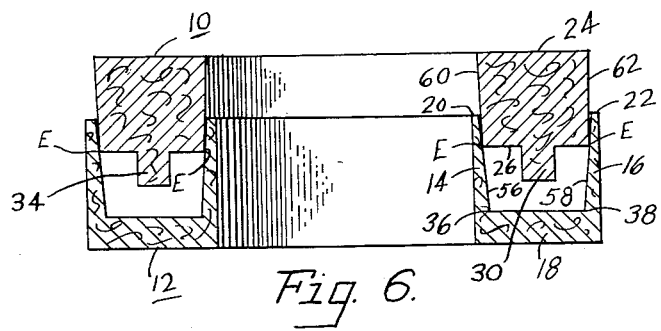
FIG. 6 is a partly cross-sectional view similar to that shown in FIG. 5, wherein the parts are relatively spaced at a different position of adjustment.

In view of the aforesaid requirements, with particular reference to the situation illustrated in FIG. 8, the inner faces 56 and 58 of the sealing member 12 are slightly tapered inwardly and downwardly with reference to the base portion 18. Also, inner and outer faces 60 and 62 of the expansion member 10 as shown in FIG. 4 are slightly tapered downwardly and inwardly with respect to the stop protrusions of the lower surface 26. It will be appreciated that the sealing device members 10 and 12, respectively, will be dimensioned so as to permit telescopic interfitting of the latter into the annular opening between the substantially concentric sealing lip portions of the former, the parts being loosely interfitted down to the points E—E as indicated in FIG. 6 without stressing the sealing lip portions 14 and 16.

With further reference to FIG. 8, it will be noted that the sealing member 12 is positioned with the base portion 18 extended away from the casing or housing 42 and with the sealing lip portions 14 and 16 extended toward the casing so that the inner faces 56 and 58 are subjected to the internal pressure of the system. Thus, an arrangement is provided wherein the sealing lip portions resist spreading from their corresponding sealing surfaces, and the internal pressure of the system is utilized to further effect a sealing action.

Figure 5:
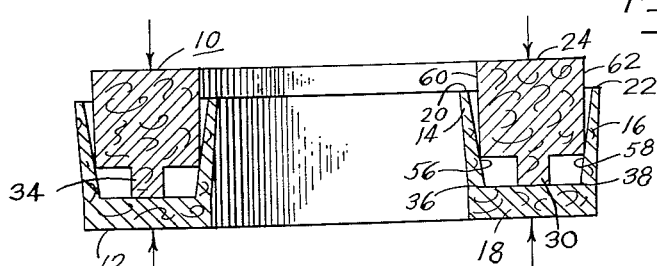
FIG. 5 is a partly cross-sectional view taken through a preferred embodiment of the present invention wherein the parts thereof, as shown in FIGS. 2 and 4, are illustrated in their assembled relation.
Figure 7:
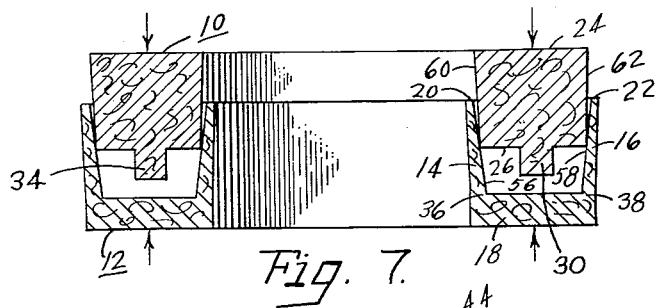
FIG. 7 is another partly cross-sectional view similar to that shown in FIG. 5, wherein the parts are relatively spaced in still another position of adjustment; and, FIG. 8 is a fragmentary generally cross-sectional view through a portion of a mechanism showing the illustrated embodiment of the present invention in mounted relation between the sealing surfaces thereof.

It is an important feature of the present invention that application of pressures, as indicated by the arrows in FIGS. 5 and 7, in directions aligned with the axial center of the packing will provide a uniform constant pressure against the sealing lip walls to expand the sealing lip portions 16 and 14 radially inwardly and outwardly, respectively, into sealing contact with the circumferential surfaces to be sealed, as, e.g., concentric surfaces 50 and 48, respectively (FIG. 8). Thus, the sealing lip contact edges 20 and 22 will be placed in fluid sealing contact with their respective sealing surfaces by means of a constant uniformly distributed force applied along points displaced from the sealing edge, with the consequent advantage that the fluid seal is maintained with an incompressible material, the flexibility of which limits the force applied along the contact areas thereof so as to sufficiently and safely seal against frangible surfaces even under conditions of slight misalignments of the latter.

Expansion of the sealing lip portions 14 and 16 is limited as a result of the abutment protrusions 28, 30, 32, and 34 being placed into contact with the base portion 18 of the member 12 at a predetermined point in the telescopic advance of the expansion ring member 10 into the member 12. Thus, the expansive force is always applied by the lower shoulder parts of the expanison ring member 10 a substantial distance away from the localized areas 36 and 38 of stress in the sealing member configuration 12. This is believed to be a further feature of the present invention which helps to make the sealing device more readily conformable to adjustments of the surfaces to be sealed without placing undue pressures thereagainst, while at the same time resisting fracture of its parts. Thus, by virtue of the positive movement limiting means, sensitive sealing pressure application is achieved and maintained even in the event of the application of clamping forces which might otherwise fracture the sealing element, as, e.g., by excessive tightening of the pressure take-up cover 64 as shown in FIG. 8.

A still further feature of the present invention is, as is apparent in the embodiment thereof shown in the drawings, that there is no appreciable radial compression of the sealing lip. This is important for the reason that plastic materials such as "Teflon" have a tendency to "cold flow" under pressure even though they are otherwise substantially non-deformable and inflexible as noted hereinabove. By avoiding conditions of pressure on the sealing lip, there is little or no "cold flow" even under adverse conditions.

While a particular embodiment of the present invention has been set forth and described with particularity, it will be appreciated that the invention is not so limited but that various changes and modifications may be made therein without departing from the spirit of the invention or the scope of the appended claims.

What we claim is:

1. In combination, a casing defining a passage, said casing having an enlarged opening in axial alinement with and contiguous to said passage, a frangible fluid conduit extending from said passage, and a sealing assembly positioned within said enlarged opening comprising: a sealing ring having an inside diameter greater than the external diameter of said conduit and an outside diameter less than the diameter of said enlarged opening, said sealing ring also having a recessed portion of frusto-conical cross section to define inner and outer sealing lip portions extending from a base portion; and an expansion ring of different cross-sectional configuration than the sealing ring recessed portion and providing circumferential edges for engaging each of said sealing lip portions in substantially line contact relation only and flexing said inner lip portion into sealing engagement with said conduit and said outer lip portion into sealing engagement with said casing, said sealing ring being positioned within said opening with its base portion extended away from the end of said passage in a manner whereby the inside surfaces of said lip portion are subjected to the internal pressure of said passage.

2. In combination, a housing having wall portions defining an opening and a recess coaxial with said opening, a frangible tube extending from said opening, and an expansible seal circumposing said tube and positioned within said recess, said seal comprising: a unitary sealing ring having a base and integrally formed substantially concentric inner and outer sealing lip portions thereon, an expansion ring having a base face in fixed axial engagement with the base of said recess, said expansion ring having laterally opposing sides and defining a cross-section therebetween different from the cross-section of the space between said inner and outer sealing lip portions of said sealing ring, said lateral sides providing peripheral edges which tangentially engage said lip portions intermediate the terminal ends thereof when in operating position to deflect said outer sealing lip into sealing engagement with said housing and to deflect said inner sealing lip into sealing engagement with said frangible tube, and abutment means integral with said expansion ring and being intermediate said peripheral edges and a face of the base of said sealing ring, said abutment means also having a radial dimension less than the least radial distance between said sealing lips.

References Cited in the file of this patent

UNITED STATES PATENTS

| | | |
|---|---|---|
| 2,238,654 | Maier | Apr. 15, 1941 |
| 2,521,692 | Costello | Sept. 12, 1950 |
| 2,670,973 | Ginther et al. | Mar. 2, 1954 |
| 2,760,794 | Hartranft | Aug. 28, 1956 |
| 2,818,287 | Josephson | Dec. 31, 1957 |
| 2,848,261 | Schultze | Aug. 19, 1958 |
| 2,905,489 | Thompson et al. | Sept. 22, 1959 |

FOREIGN PATENTS

| | | |
|---|---|---|
| 567,346 | Great Britain | Feb. 9, 1945 |